United States Patent [19]

Lowe

[11] 4,454,496
[45] Jun. 12, 1984

[54] CONFORMAL HEAD-UP DISPLAY

[75] Inventor: James R. Lowe, Rancho Palos Verdes, Calif.

[73] Assignee: McDonald Douglas Corporation, Long Beach, Calif.

[21] Appl. No.: 202,167

[22] Filed: Oct. 30, 1980

[51] Int. Cl.³ ............................ G08G 5/00; G01S 1/16
[52] U.S. Cl. ..................................... 340/980; 340/951; 340/973; 364/428; 343/409
[58] Field of Search ............. 340/27 NA, 27 AT, 24, 340/27 R, 26; 364/424, 428, 429, 432, 433, 443, 447; 244/181, 183–186; 343/112 R, 112 CA, 112 TC, 102, 107, 108, 409

[56] References Cited

U.S. PATENT DOCUMENTS

| | | | |
|---|---|---|---|
| 3,324,471 | 6/1967 | Rover | 343/108 SM |
| 3,355,733 | 11/1967 | Mitchell et al. | 340/27 NA |
| 3,643,213 | 2/1972 | Yurasek et al. | 340/27 NA |
| 3,668,622 | 6/1972 | Gannett et al. | 340/27 NA |
| 3,686,626 | 8/1972 | Bateman et al. | 340/27 NA |
| 3,711,826 | 1/1973 | La Russa | 340/27 NA |
| 4,104,612 | 8/1978 | Lowe | 340/27 AT |
| 4,277,771 | 7/1981 | Chapin et al. | 340/27 NA |

Primary Examiner—Donnie L. Crosland
Attorney, Agent, or Firm—Henry M. Bissell; George W. Finch; Donald L. Royer

[57] ABSTRACT

A system for providing a Head-Up Display (HUD) on board an aircraft to assist a pilot in guiding the aircraft. The display is positioned in the pilot's normal line of sight. In one mode it utilizes a radio beam landing system such as an ILS (Instrument Landing System) to generate symbols that correspond to visual ground cues which, together with an aircraft symbol display, provide the pilot with cues for aligning the aircraft on the appropriate path for approach and landing. The system moves the aircraft symbol in accordance with motion changes of the aircraft. During a landing approach the pilot "flies" the aircraft symbol relative to the simulated and/or real ground cues. By making the HUD correspond with ground cues, the abrupt transition from instrumented to visual flight is eliminated. At altitudes below which available ILS is not acceptable, the system provides a smooth transition to a mode independent of ILS and then to a flare mode. The system also includes a mode that is totally independent of any ground installation. The system also provides an altitude hold mode with a smooth transition to the approach mode.

21 Claims, 16 Drawing Figures

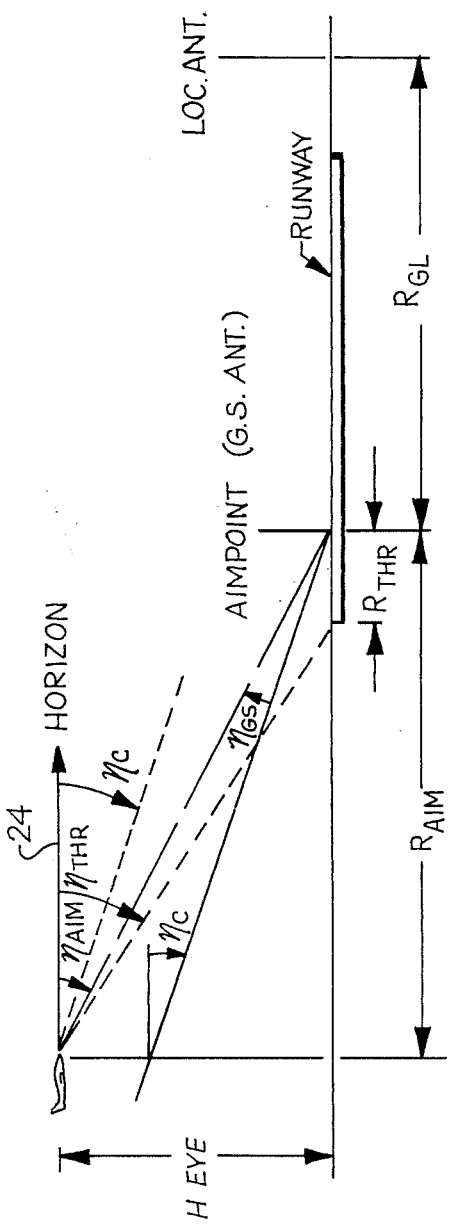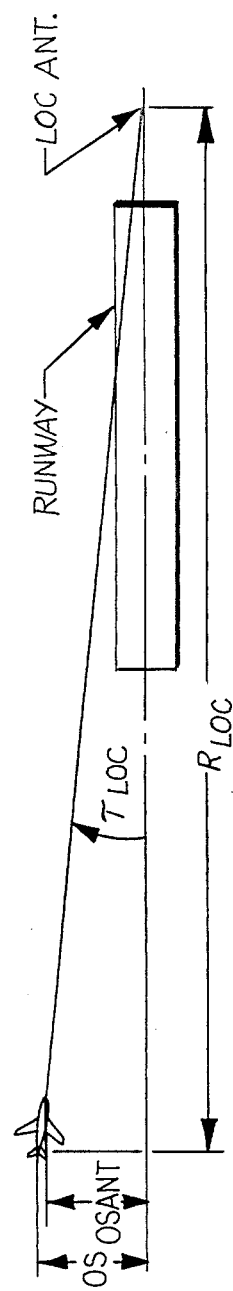

CONFORMAL HEAD-UP DISPLAY

BACKGROUND OF THE INVENTION

1. Field of the Invention

This invention relates to aircraft control systems and, more particularly, to systems which present to the pilot position-controlled, generated image, cue indications on a head-up display (HUD) superimposed with visible external cues.

2. Description of the Prior Art

A head-up display (HUD) is one in which a generated image is projected onto a transparent screen in the pilot's normal line of sight so that the pilot can observe the projected image while continuing his normal observation of outside cues.

Prior HUD systems have been developed and are well known, such as a lead-computing gunsight for military aircraft and approach-to-landing path displays. The latter type of HUD designs hve made use of a selectable fixed approach path depression angle and/or the instantaneous descent angle of the aircraft (velocity vector) either separately or combined in one display symbol.

One HUD system, of particular interest for commercial aircraft, is the system disclosed in my prior U.S. Pat. No. 4,104,612 entitled HEAD-UP DISPLAY COMMAND BAR GENERATOR. In that disclosure, a feedback-compensated control system makes use of the fixed depression angle combined with computed rate information to derive the HUD command signal. The pilot, by maneuvering to keep the symbol on an aimpoint (the desired touchdown zone), closes the loop of a feedback-compensated control system. The system is referred to herein as the "Compensated Control" HUD.

SUMMARY OF THE INVENTION

Arrangements in accordance with the present invention permit the pilot to fly the aircraft head-up during approach and landing for virtually all conditions which may be encountered by the aircraft. In accordance with one aspect of the invention, the HUD is arranged so that the pilot is able to use the display in the same manner in both IFR (Instrument Flight Rules) and VFR (Visual Flight Rules) conditions, thus avoiding a shift from one type of cue to another as the pilot proceeds from IFR conditions to VFR conditions. The system also provides a smooth transition from an instrumented approach to a mode independent of the ILS (Instrument Landing System) and then to a flare mode. Particular arrangements in accordance with the present invention provide magnification of the vertical control cue of the Compensated Control HUD in accordance with glideslope and glideslope rate information, derived from an ILS beam, during approach for landing under such control.

The Compensated Control HUD does not require ground-based instrumentation to provide guidance to a runway that is in sight. An arrangement in accordance with the present invention provides lateral guidance that is cued from a visible runway and requires no ground-based instrumentation. In this arrangement the aircraft symbol display is controlled to remain astride the runway which is being approached, even though the aircraft may be crabbed into a crosswind.

One particular arrangement in accordance with the present invention serves to control the aircraft (at the pilot's option) at a selected fixed altitude prior to pitching over to proceed on the selected descent path. In this arrangement, the location of a reference aim symbol relative to the aircraft symbol in the display provides an altitude hold command. The pilot by maneuvering his aircraft to hold the HUD aircraft symbol on the reference symbol will cause the aircraft to maintain the selected altitude. When the aircraft symbol intercepts the runway aimpoint (visible from the ground through the display), the pilot knows he is at the point where he should begin his selected descent path and he then pitches over to proceed toward the runway aimpoint.

BRIEF DESCRIPTION OF THE DRAWINGS

A better understanding of the present invention may be had from a consideration of the following detailed description, taken in conjunction with the accompanying drawings in which:

FIGS. 4A and 4B illustrate the geometric parameters required in the computation of the display parameters of FIG. 3;

FIG. 13 is a schematic diagram illustrating a system for generating a head-up display in accordance with the present invention.

DESCRIPTION OF THE PREFERRED EMBODIMENTS

Figure 1:
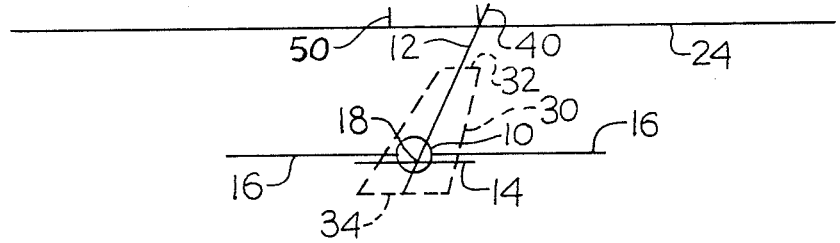
FIG. 1 is an illustration of one particular HUD display in accordance with the invention, showing runway parameters and other generated flight cues projected on the display.

The Compensated Control HUD of my prior patent provided vertical guidance for the pilot during descent prior to landing. Preferred embodiments of the present invention utilize my patented Compensated Control HUD and in addition provide HUD lateral and vertical control guidance in a manner which minimizes the transition from IFR to VFR conditions. It also provides command guidance from the minimum ILS control altitude to flare, during a non-instrumented approach and during altitude hold including a smooth transition to a descent path. The ILS is referenced herein, but the invention is not restricted to any particular radio beam landing system.

My Compensated Control HUD is disclosed in detail in my prior U.S. Pat. No. 4,104,612, incorporated by reference herein, and the reader is referred to that patent for a more detailed discussion of that system and a showing of the image generator and projection arrangement which develops the HUD. Summarizing very briefly from that patent, a selected glidepath angle plus aircraft motion terms like pitch, altitude rate and normal acceleration are coupled into the control law circuit module, which generates the deflection signal. This deflection signal is coupled into a symbol generator which generates the image of a command bar (aircraft symbol) on a cathode ray tube (CRT). The deflection signal controls the vertical location of the command bar. The CRT image is projected onto a collimating lens and to a combiner, which is a non-interfering transparent glass located between the pilot's eyes and his forward field of view. The command bar appears to the pilot as superimposed on his view of the runway during a landing approach. The collimated command bar constitutes an aimsight. In steady state, a deflection signal transmitted from the control law module represents the selected glidepath angle, causing the aimsight (collimated command bar) to be held at the selected angle relative to the horizontal. If the aircraft is on the selected glidepath, the pilot will see the bar superimposed on his runway aimpoint. Should the pilot see the bar above or below his aimpoint, he interprets it as control error and corrects with elevator control. An aircraft maneuver produces changes in the aircraft motion terms, which are coupled into the control law module, which produces a change in bar deflection, thus completing the loop of the Compensated Control HUD system.

One principal embodiment of the present invention is an augmentation to my prior U.S. Pat. No. 4,104,612 which utilizes the glideslope signal of a radio beam landing system such as an instrument landing system (ILS) to provide path error magnification. Though my prior patented system is capable of providing vertical guidance in a VFR, non-instrumented approach to the accuracy required of an autopilot by FAA Circular AC 120-29 for an IFR Category II approach, the addition of the ILS augmentation of this embodiment will command closer tracking. According to my prior patent the pilot is guided by the vertical motion of a symbol, herein called aircraft symbol 10 in FIG. 1, relative to a point on the ground, herein called aimpoint 18 in FIG. 1. The vertical location of the aircraft symbol relative to the aimpoint is determined by the compensated control command signal. Where an ILS glideslope beam is available, the aimpoint can be supplemented with a HUD symbol, herein called aim symbol 14 in FIG. 1. Also with the aid of the glideslope error signal the aircraft symbol vertical command signal is amplified. This amplification increases the separation between the aim symbol 14 and the aircraft symbol 10 for a given separation of the aircraft from the glidepath. By increasing the visibility of the error the pilot may fly a tighter control during this instrumented approach.

Figure 2:
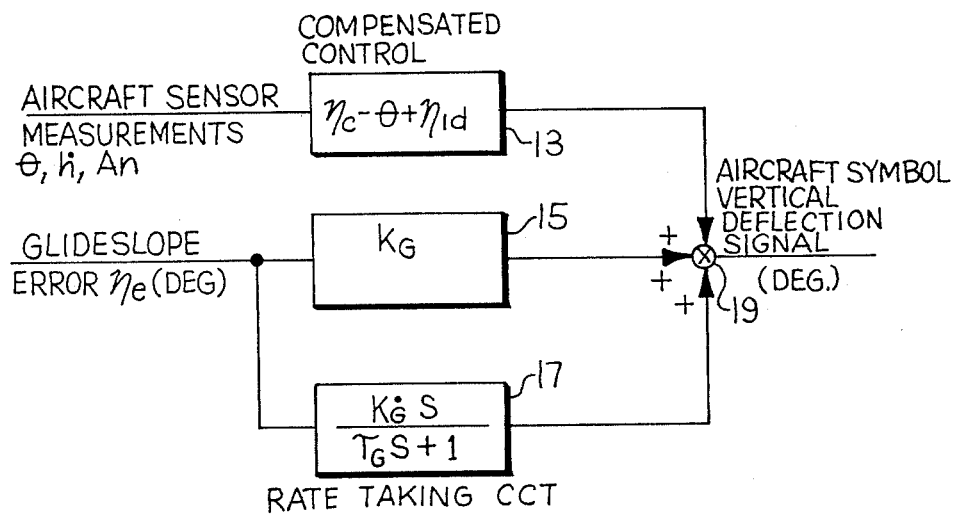
FIG. 2 is a block diagram of circuitry for incorporating glideslope error signals to amplify the aircraft symbol vertical deflection signal in an ILS approach.

In this embodiment vertical position of the aircraft symbol in the display is determined by the Compensated Control law of my prior patent referenced above plus the glideslope signal augmentation. A vertical signal of the prior patent ($\eta_c - \theta + \eta_{1d}$) is combined with ILS glideslope error and glideslope error rate as shown in FIG. 2. FIG. 2 shows a Compensated Control circuit 13 from my prior patent combined with glideslope error proportional gain 15 and glideslope error rate derived from the rate taker 17. The rate taker time constant $\tau_G$ should be fast relative to aircraft pitch dynamics. Gains $K_G$ and $K_{\dot{G}}$ are adjusted for optimum control. The outputs from stages 15 and 17 are added to the Compensated Control output in a summing stage 19. When no ILS signal is available, the constants $K_G$ and $K_{\dot{G}}$ are set to zero.

Another aspect of the invention relates to a method of combining the lateral flight director, vertical guidance, and a perspective display of ground cues so as to provide an instrumented (radio beam) guidance that is conformal with the real world visual cues. The pilot may "fly" the aircraft symbol, which pitches, rolls and yaws relative to the real world, to either a simulated runway aimpoint (a point at the center of the runway where the glideslope intersects the runway) while flying during restricted visibility or the actual runway when it becomes visible.

FIG. 1 shows such a HUD comprising an aircraft symbol 10, a perspective line 12 that superimposes on the actual runway centerline when it is visible, and an aim symbol 14 that appears like a line on the ground that crosses the runway 30, 32, 34 parallel to the threshold 34 at the aimpoint, which is located at the glideslope antenna. The runway aimpoint 18 is indicated by the intersection of the perspective centerline 12 and the aim symbol 14. (The aimpoint can be simulated by other symbologies; for example a perspective display of the total runway 30, 32, 34 with aimpoint, or a small circle located at the aimpoint.) The horizon line 24 has displayed on it a line 50 indicating the aircraft heading and a "V" symbol 40 denoting the runway bearing, a value which is set into the equipment by the pilot in preparation for the approach. Thus, the symbol 40 relative to symbol 50 represents the runway bearing relative to aircraft heading, or Course Error. The aircraft symbol 10 symbolizes an aft view of an aircraft controlled by the pilot in pitch, roll and yaw to correspond to motions of his aircraft. These motions are made evident by a pair of lines or "wings" 16 emanating from a central point, which can be indicated by the circle as shown. During the approach the pilot "flies" the aircraft symbol to keep it centered on the aimpoint 18. The particular symbology described herein is only one example for picturing the space location of aircraft and ground cues in the display. A portion of the embodiment disclosed encompasses the generation of electronics that determine this space location in the conformal display.

Figure 3:
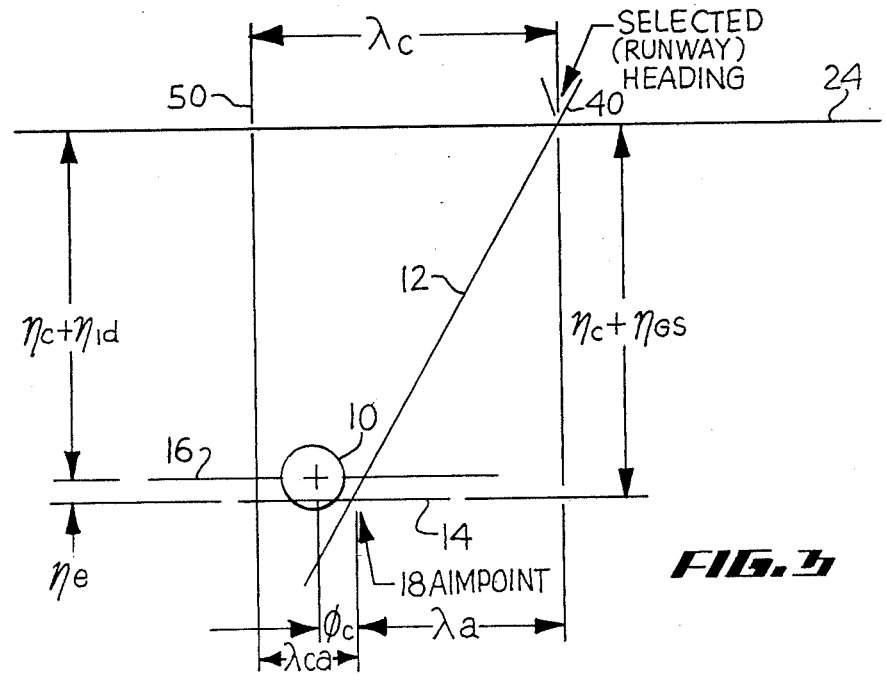
FIG. 3 is an illustration of the HUD parameters related to an instrumented approach.

FIG. 3 illustrates parameters required in the generation of the conformal display for an instrumented approach. The vertical deflection of the aircraft symbol 10 relative to the horizon 24 is determined by the control law of my prior patent (Compensated Control law) and equals $\eta_c + \eta_{1d}$ where $\eta_c$ equals the desired angle of descent and $\eta_{1d}$ is the feedback compensation lead term. The Compensated Control circuit is designed so that if the pilot maneuvers his aircraft in the vertical plane to hold the aircraft symbol on some line fixed relative to the ground, the aircraft will fly a path that descends at $\eta_c$ degrees and terminates at the fixed point. The vertical deflection of th aircraft symbol relative to the runway aimpoint is $\eta_e$. If the aircraft descent angle is controlled to hold the center of the aircraft symbol on the aimpoint 18, the command is satisfied and the aircraft will smoothly acquire and track the desired descent path. Aim symbol 14 is computed to stay fixed in the direction of the glideslope antenna on the ground. Therefore, by holding the aircraft symbol 10 on line 14, the pilot will follow an $\eta_c$ descent path that terminates at the glideslope antenna.

The lateral deflection of the aircraft symbol 10 relative to the runway aimpoint 18 is generated from a signal that is like a lateral flight director roll command signal. It contains raw localizer signals plus lateral lead inputs. If the pilot maneuvers his aircraft laterally to hold the center of the aircraft symbol 10 on the aimpoint 18, the flight director command is satisfied and the aircraft will smoothly acquire and track the localizer beam.

The aim symbol 14 is located in the display at the runway aimpont by depressing the symbol below the horizontal by an angle equal to the depression angle of the aimpoint located at the glideslope transmitter antenna $\eta_{AIM}$ (FIG. 4A). This is computed from the glideslope angle $\eta_c$ plus the vertical angle deviation of the aircraft from the glideslope $\eta_{GS}$ as measured by the glideslope error signal at the aircraft.

$$\eta_{AIM} = \eta_c + \eta_{GS}$$

Referring to FIG. 3, $\lambda_{ca}$, the lateral deflection of the aimpoint 18 relative to the display center (aircraft heading) 50, is equal to $\lambda_c$, the horizontal angle between aircraft heading and selected runway bearing (Course Error), plus $\lambda_a$, the horizontal angle between runway bearing and aimpoint.

$$\lambda_{ca} = \lambda_c + \lambda_a$$

$\lambda_a$ is the product of the depression angle of the aimpoint $\eta_{AIM}$ and the ratio of the pilot's eye height (HEYE, FIG. 4A) to the lateral distance his eye position is offset from an extension of the runway centerline (OSANT, FIG. 4B).

$$\lambda_a = \eta_{AIM} \times HEYE/OSANT$$

The perspective line 12 is drawn from the selected runway bearing 40 on the horizon to the aimpoint 18.

The following geometric computations are necessary to the solution of this embodiment. Referring to FIG. 4B, the distance the aircraft localizer receiver antenna is offset from the runway centerline OS is computed from the angle derived from the localizer error signal $\tau_{LOC}$ and the distance from the localizer transmitter $R_{LOC}$. HEYE and OSANT are corrected for eye location relative to radio altimeter and aircraft localizer receiver antenna respectively. Finally the distance to the localizer transmitter is computed as the distance to the glideslope transmitter $R_{AIM}$, which is a function of altitude and glideslope depression angle (described above), plus an approximate distance between glideslope transmitter and localizer transmitter $R_{GL}$.

$$R_{LOC} = R_{AIM} + R_{GL}$$

At $R_{AIM}$ distances that are less than the minimum limit of glideslope reliability $R_{AIMIN}$, $R_{LOC}$ becomes a function of airspeed TAS and time t.

$$R_{AIM} < R_{AIMIN}$$

$$R_{LOC} = R_{AIMIN} + R_{GL} - (TAS \times t)$$

Runway edgelines, which may be added to the display, are computed in the same manner as the centerline by adding and subtracting to OSANT the runway half width. The depression angle of the threshold $\eta_{THR}$ and runway far end can be computed as the arctangent of (HEYE/horizontal distance from aircraft to the respective runway ends). The horizontal distances are computed by adding or subtracting the distance between glideslope transmitter and runway ends.

Figure 5:
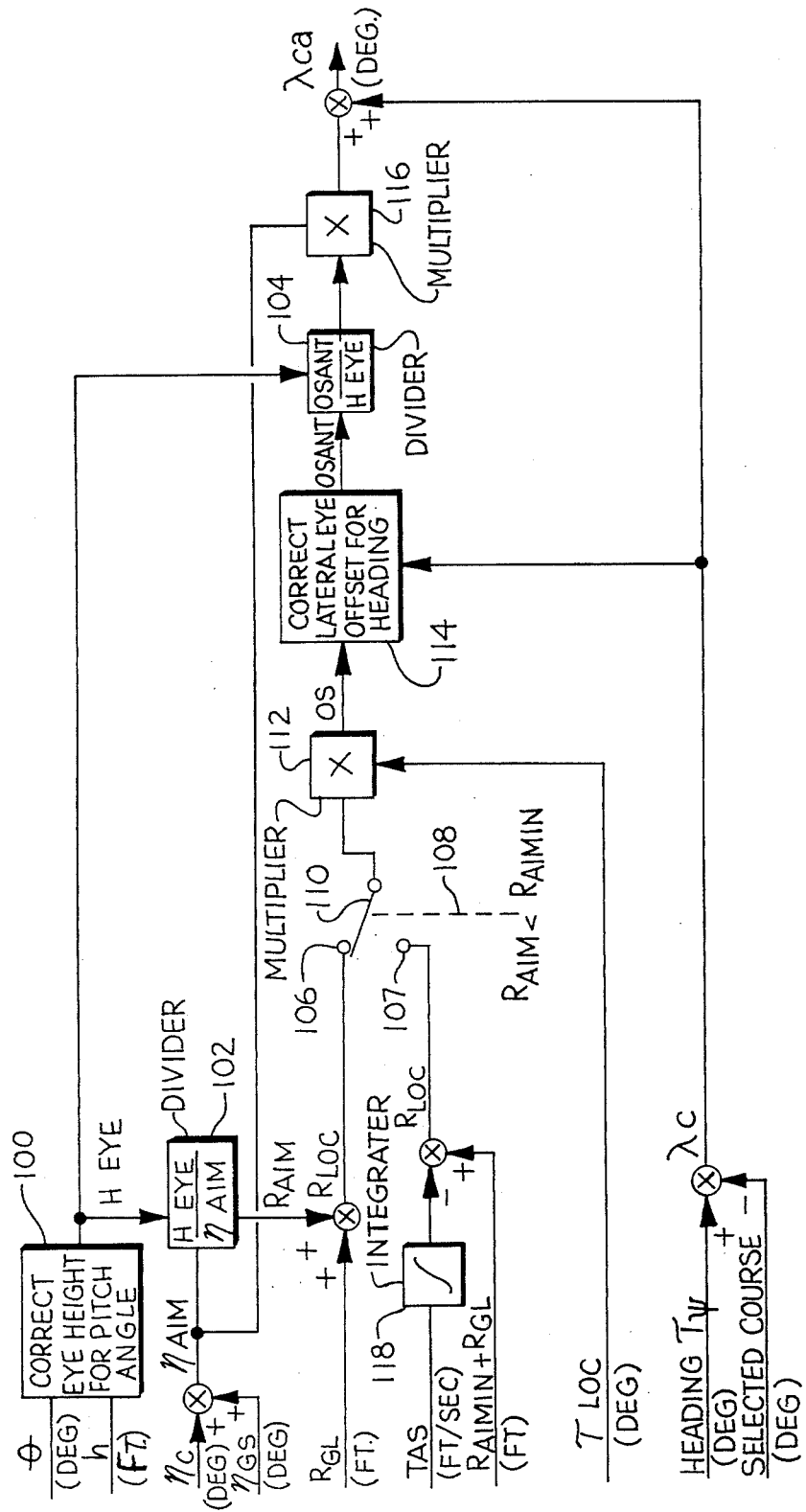
FIG. 5 is a block diagram illustrating circuitry for determining lateral deflection of the aircraft symbol as shown in FIG. 3 in accordance with the geometric parameters of FIGS. 4A and 4B.

FIG. 5 is a schematic representation in block diagram form of circuitry that generates the signal $\lambda_{ca}$, which locates in the display the perspective direction of the aimpoint as seen by the pilot, as described hereinabove by reference to FIGS. 3 and 4A-4B. As is shown in FIG. 5, signals indicating pitch angle and altitude are applied to a stage 100 which corrects altimeter reading to eye height, which is a function of pitch angle, and provides a signal HEYE to divider stages 102 and 104. In the divider stage 102, HEYE is divided by a signal derived from the summation of $\eta_c$ and $\eta_{GS}$ (see FIG. 4A). The output of divider 102, $R_{AIM}$, is added to the signal $R_{GL}$ to develop the signal $R_{LOC}$ which is applied to one pole 106 of a switch 108. The armature 110 of the switch 108 is connected to a multiplier stage 112, the other input to which is the localizer error signal $\tau_{LOC}$. The output of the multiplier 112 is the signal OS which is applied to a correction stage 114 for combination with a signal $\lambda_c$ which is the difference between aircraft heading and selected runway bearing. The correction stage 114 provides the correction for lateral offset between the aircraft's localizer receiver antenna and the pilot's eyes when the aircraft is not on heading, and provides an output signal OSANT which is applied to the divider 104. The output of divider 104, OSANT/HEYE, is multiplied by $\eta_{AIM}$ in a multiplier stage 116 and the product, $\lambda_a$, is summed with the horizontal angle $\lambda_c$ to provide the signal $\lambda_{ca}$.

When the distance to the glideslope transmitter, $R_{AIM}$, becomes less than the minimum limit of glideslope reliability, $R_{AIMIN}$, the armature 110 of switch 108 transfers to the pole 107 and $R_{LOC}$ is generated as a function of time. Pole 107 receives a signal which is the difference between $R_{AIMIN} + R_{GL}$ and the integration (provided in integrator stage 118) of true air speed. Under these conditions, the signal at pole 107 is applied through switch 108 via armature 110 and is processed as previously described in place of the previous $R_{LOC}$ signal.

Where it is considered unsafe to continue to follow the ILS glideslope below a minimum height, the pilot must either discontinue the landing or be dependent upon runway and terrain visual cues. One preferred embodiment allows a continuation of HUD guidance below this minimum height by transitioning from an instrumented approach to a mode independent of the ILS and then to a flare mode. This embodiment also provides smooth transitioning from one mode into the next.

A landing approach can be continued below ILS usability, with ground cues not visible, by maintaining the same angle of descent $\eta_c$. This is accomplished by converting the aim symbol 14 so that it will indicate the direction that it is desired to descend and converting the aircraft symbol 10 so that it will indicate the direction the aircraft is descending at any moment. The aim symbol, fixed relative to the ground, will become the command aim symbol 64 (FIG. 6A), which is depressed below the horizontal by the fixed angle $\eta_c$; and the aircraft symbol will be depressed below the horizontal by the velocity vector $\gamma$. Thus by maneuvering to hold the aircraft symbol 10 on the aim symbol 64, the aircraft will be flown in the directon $\eta_c$. In this mode the aim symbol at $\eta_a$ equals $\eta_c$ and the aircraft symbol at $\eta_{sym}$ equals $\gamma$, the velocity vector.

The transference from the ILS dependent mode to the constant direction mode should be done at the lowest altitude that the ILS glideslope is satisfactory (designated "transition height"), because the constant direction is maintained open loop and is dependent upon the accuracy of obtaining $\gamma$, the velocity vector. In the absence of an Inertial Navigation System, $\gamma$ is dependent upon air measurements which are affected by wind.

Figure 6A:
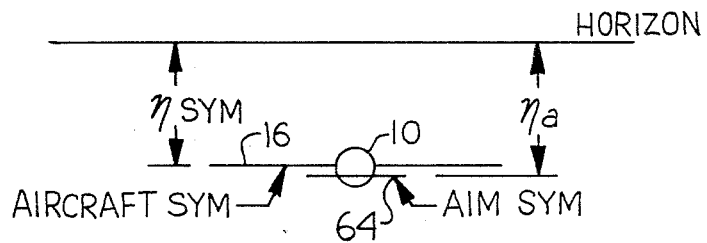
FIGS. 6A and 6B illustrate in the display and the vertical plane the parameters related to the preflare and flare modes.
Figure 6B:
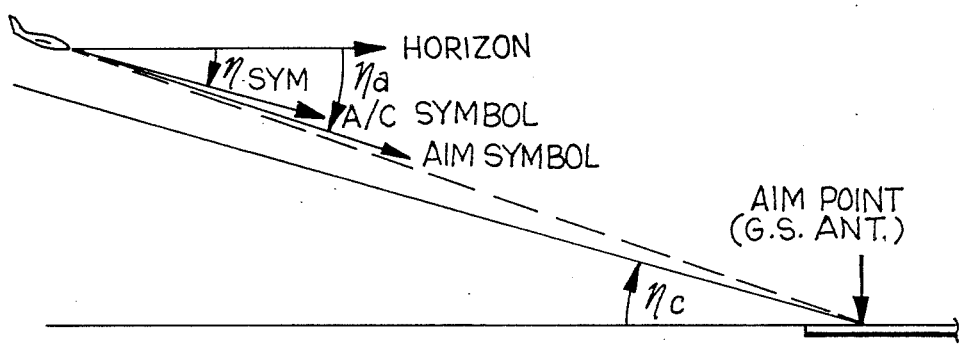

FIGS. 6A and 6B illustrate particular parameters used in preflare and flare modes. In the flare mode aim symbol 64 is converted to command a programmed sink rate reduction, while the aircraft symbol 10 is converted to indicate a sink rate error relative to the aim symbol. Thus in this mode the aim symbol 64 at $\eta_a$ becomes sink rate command and the aircraft symbol at $\eta_{sym}$ indicates sink rate. The flare embodiment of this invention, though described as associated with an instrumented IFR approach, operates the same in a non-instrumented approach under VFR conditions.

An instantaneous change in mode at a selected altitude would produce a step in the input and a jump in the symbology. Circuitry for avoiding this is depicted in the block diagrams of FIGS. 7 and 8. The circuit of FIG. 7 controls the vertical deflection of the aircraft symbol 10 while the circuit of FIG. 8 controls the vertical deflection of the aim symbol 64.

Figure 7:
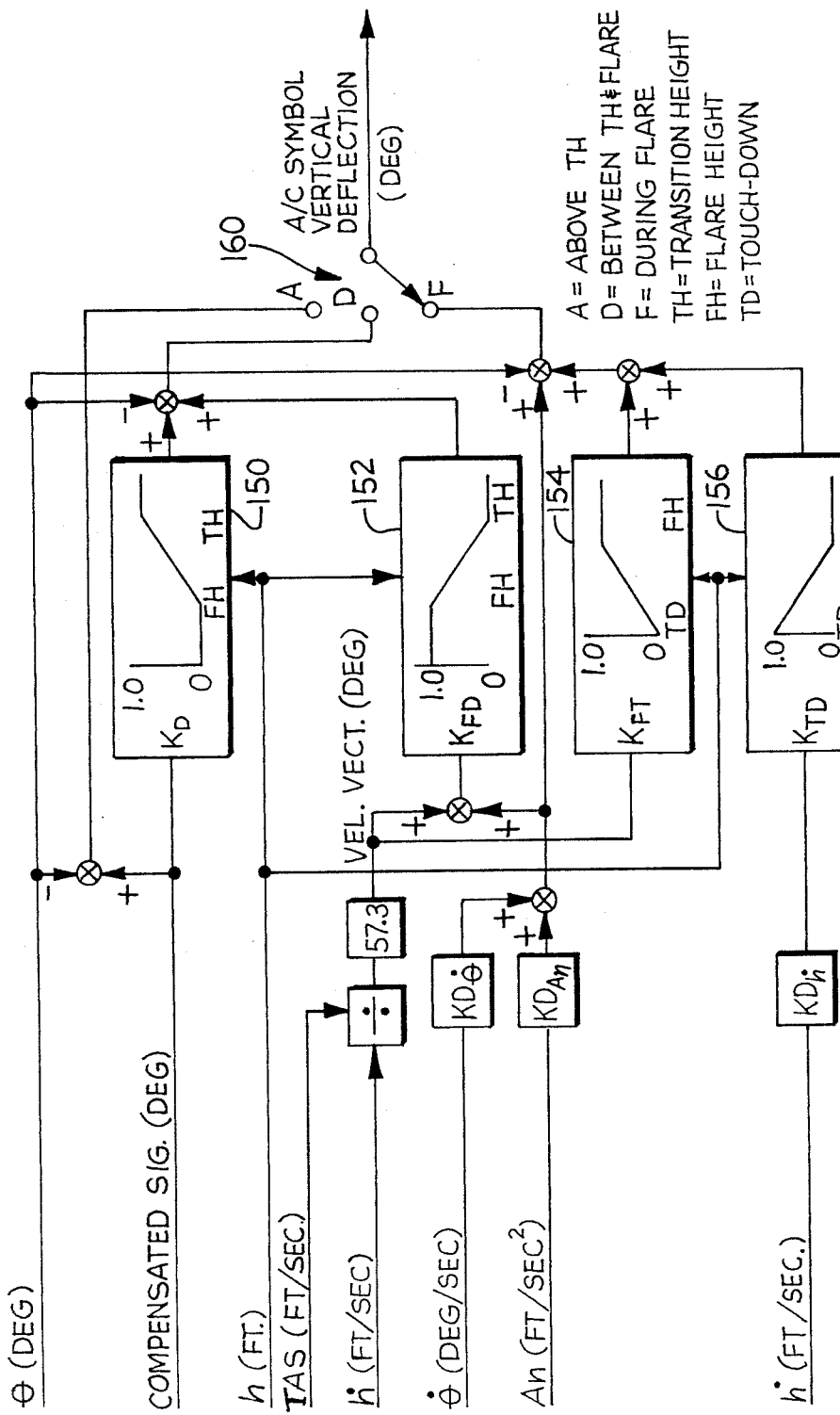
FIG. 7 is a block diagram of circuitry for controlling the aircraft symbol vertical deflection in the final phases of landing approach.

FIG. 7 depicts the circuitry that transfers aircraft symbol control from Compensated Control to velocity vector by linearly reducing the gain of the Compensated Control input from one at transition height TH to zero at flare height FH, while the gain of the velocity vector input is linearly increased from zero to one. This is depicted respectively at 150 and 152. Then between flare height and touchdown, aircraft symbol control is similarly transferred from velocity vector to altitude rate feedback as shown by 154 and 156. The switching is indicated conceptually by the switch 160. Thus, the switch 160 may be considered to be at the position A for altitudes above TH (transition height), at the position D between transition height and flare, and at the position F for altitudes below the flare height.

Figure 8:
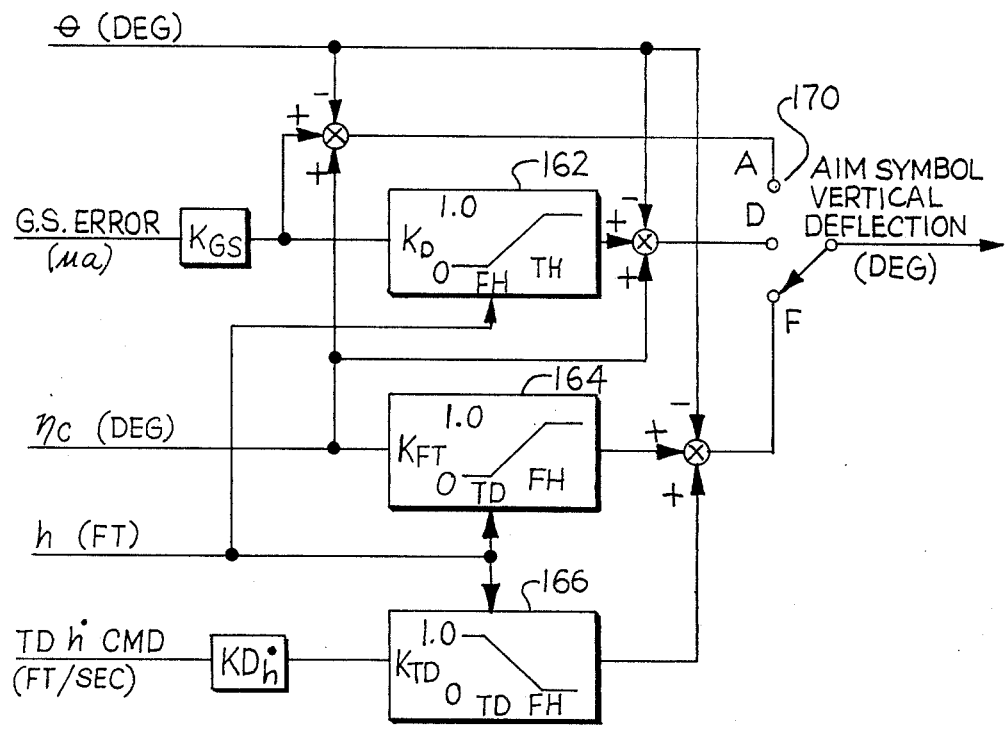
FIG. 8 is a block diagram of circuitry for controlling the aim symbol vertical deflection in the final phases of landing approach.

FIG. 8 depicts the aim symbol position control that corresponds to the aircraft symbol modes described. Above TH the aim symbol designates the direction of the aimpoint (or the glideslope antenna). At TH the gain of the ILS glideslope error signal input to the aim symbol begins to reduce linearly, reaching zero at flare height as indicated by 162, so that at flare height the aim symbol depression angle equals $\eta_c$. Then between flare height and touchdown the aim symbol depression angle is reduced to an angle consistent with the desired touchdown descent rate. This is depicted at 164 and 166.

Mode switch 170 in FIG. 8 corresponds to 160 in FIG. 7.

Note that the switching altitudes described need not be restrictive. For instance in mode D, designated as between TH and flare, the gain change could have been completed above flare and constant gain maintained until flare height is reached. Also the gain changes need not be linear.

In FIG. 7 the velocity vector input to 152 and 154 is shown computed as vertical speed h divided by horizontal speed V. Horizontal speed may be obtained from airspeed (TAS) or ground speed where available. Lead inputs $\dot{\theta}$ and $A_n$ are combined with the velocity vector to make it flyable.

Flare is controlled according to aircraft altitude and descent rate. The aim symbol in FIG. 8 converts from a descent angle reference $\eta_c$ to a descent rate reference TD h CMD, while the aircraft symbol in FIG. 7 converts from a measured descent angle to a measured descent rate. Thus the vertical position of the aircraft symbol relative to the aim symbol cues the pilot that he is above or below a programmed reduction in descent rate as he approaches touchdown.

A further embodiment of the invention provides lateral guidance without the aid of ground-based instrumentation such as the ILS. This, combined with my prior U.S. Pat. No. 4,104,612, which has been referred to herein as the Compensated Control HUD, makes it possible to "fly" an aircraft symbol both laterally and vertically to an aimpoint on a visible runway where no ILS facilities are available. The lateral guidance aids the pilot in acquiring and holding a path that is colinear (lines up) with the runway centerline. Lead information is incorporated in the lateral deflection of the aircraft symbol to aid the pilot in anticipating overshoot. Additionally, because the aircraft symbol is held astride the runway, vertical control to the runway aimpoint is made easier.

Figure 9:
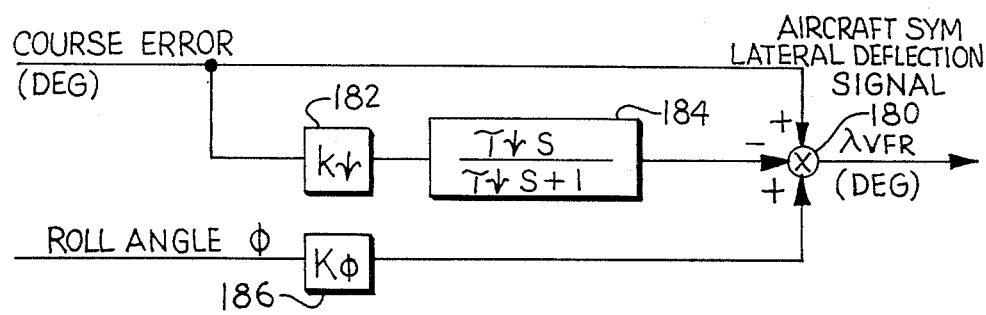
FIG. 9 is a block diagram illustrating particular filter circuitry to provide lateral command with lead for a non-instrumented approach.

FIG. 9 shows the generation of the signal controlling the lateral deflection $\lambda_{VFR}$ of the aircraft symbol relative to aircraft heading (center of the display). In the short term the aircraft symbol moves laterally with aircraft heading. In the steady state, however, the lateral position is washed out to selected runway heading. In steady state the aircraft symbol lateral position is the angular distance of runway bearing (selected heading) from aircraft heading; this equals the Course Error input. A change in aircraft heading is transmitted through the wash-out filter 182, 184 to cause, in the short term, the aircraft symbol to hold its position relative to the display center, since equal and opposite signals are summed at 180. At the same time the real world runway moves in the direction opposite to the aircraft's turn (thus providing lead relative to the real world). In the long term the signal that is transmitted through the wash-out filter circuitry reduced to zero, so that again the aircraft symbol is deflected from the center of the display by the Course Error, and thus it remains in the direction of the runway bearing. The lateral deflection of the aircraft symbol relative to aircraft heading is $$\lambda_{VFR} = \left(1 - \frac{\tau_\psi S}{\tau_\psi S + 1}\right) \times \text{Course Error}$$

The time constant $\tau$ of the wash-out circuit should be long relative to aircraft lateral dynamics (10 seconds for large aircraft). This design, as indicated by FIG. 9, produces lateral lead in a turn by the motion of the aircraft symbol relative to the ground. The lead input to the lateral guidance may be obtained by various techniques. Since the purpose of the wash-out circuit is to provide a deflection of the aircraft symbol in the short term for changes in aircraft heading, aircraft heading may be substituted for the Course Error input to the wash-out circuit. This avoids the transient due to the change in Course Error when the pilot selects a new Selected Heading.

$$\lambda_{VFR} = \text{Course Error} - \left( \frac{\tau_\psi S}{\tau_\psi S + 1} \right) \times \text{heading}$$

Additional lead may be gained with a roll angle input, with $K_\psi$ 182 and $K_\phi$ 186 gains adjusted. Also if an Inertial Navigation System is available, the inertial lateral motion signal can provide the best possible control lead.

Figure 10A:
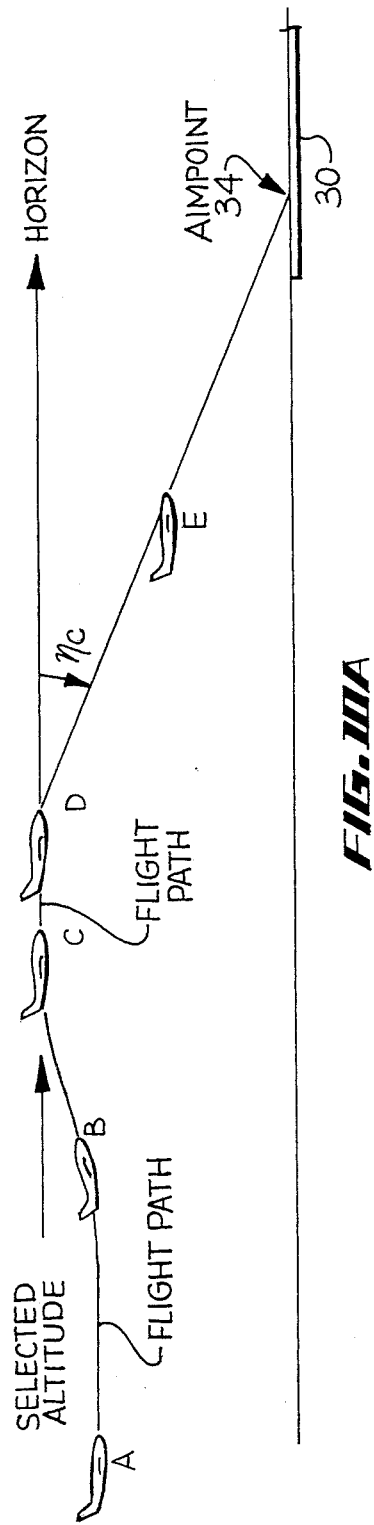
FIGS. 10A and 10B illustrate aircraft locations and corresponding displays during altitude hold and transition to the approach.
Figure 10B:
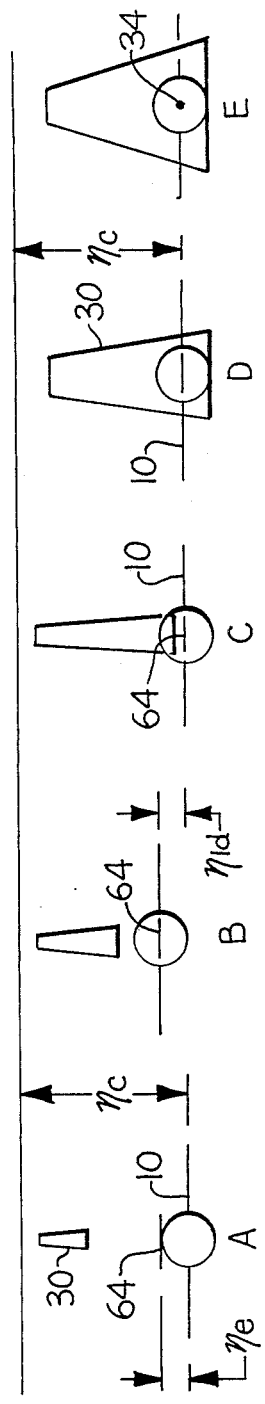

A further major embodiment comprises an altitude hold mode. In the altitude hold mode, the aim symbol 64 of FIG. 6A provides a command relative to the aircraft symbol 10 that enables the pilot to hold his aircraft at a constant selected altitude. It also enables him to fly a smooth transfer without overshoot to the descent path when the proper point is reached without change in symbology or manner of control. A HUD approach generally involves flying at a constant altitude while watching the HUD aircraft symbol as it moves relative to the ground. When this symbol reaches his runway aimpoint, the pilot knows he is to pitch over and begin his descent along the selected descent path. This situation is represented in FIGS. 10A and 10B which show the altitude hold mode at points a through c. At d, the aircraft symbol 10, located below the horizon by the fixed descent angle $\eta_c$ is superimposed over the aimpoint. Thus at point d, the pilot pitches over and proceeds through the point e along the descent path to touchdown at the aimpoint. In this manner altitude hold guidance and guidance for transitioning to landing approach are provided as the pilot continues to fly head-up (looking through the windshield).

The altitude hold mode comprises the two display symbols shown in FIG. 10B, a guidance symbol, or aircraft symbol 10, and a command symbol, or aim symbol 64. While the aircraft holds the selected altitude the aircraft symbol and aim symbol will be located together at a fixed depression angle $\eta_c$ as shown at points c and d, FIGS. 10A-10B. Should the aircraft be maintaining a constant altitude but below the selected altitude, the aim symbol will appear above the aircraft symbol by the angle $\eta_e$ that is proportional to the altitude error. This is shown at a, FIGS. 10A-10B; this tells the pilot to "fly up". The pilot's task is to maneuver his aircraft to hold the aircraft symbol in line with the aim symbol as at b, c, and d. He "flies" the aircraft symbol to the aim symbol. At b, as the aircraft climbs, the command is satisfied through the selected altitude has not yet been reached. Dynamic lead terms $\eta_{ld}$ added to the fixed angle $\eta_c$ have deflected the aircraft symbol up. This constitutes feedback damping, which aids the pilot in smoothly acquiring and tracking the selected altitude.

Figure 11:
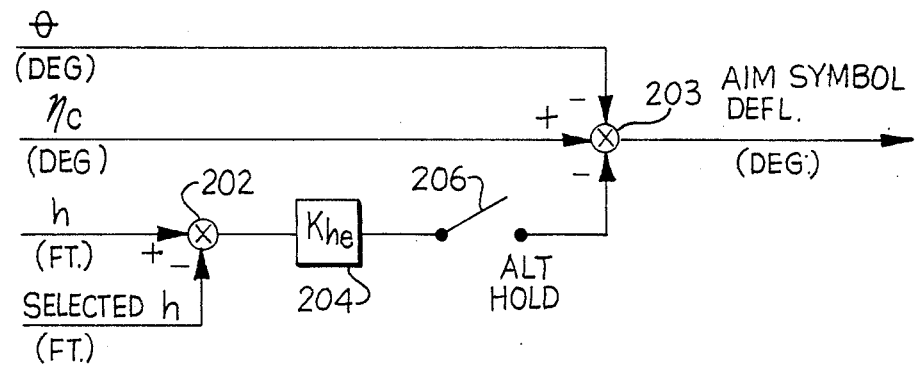
FIG. 11 is a block diagram of circuitry for controlling vertical deflection of the aim symbol in the altitude hold mode.

The circuit of FIG. 11 serves to provide a command signal for aim symbol deflection. The selected altitude $\eta_{SEL}$ is set into the equipment by the pilot and is summed with the radio altimeter reading h in a summing stage 202. The resulting difference is applied through a gain stage 204 which converts an altitude error to an aim symbol deflection angle; the gain is optimized for ease of tracking. When in the altitude hold mode, switch 206 is closed and the negative of the scaled altitude error is applied to a summing stage 203 for combination with the descent path angle $\eta_c$ and the pitch angle $\theta$. $\theta$ provides pitch stabilization (that is, symbology will not pitch with aircraft), a requirement in any HUD system. The signal out of summing stage 203 is applied to the deflection circuit for the aim symbol 64.

Figure 12:
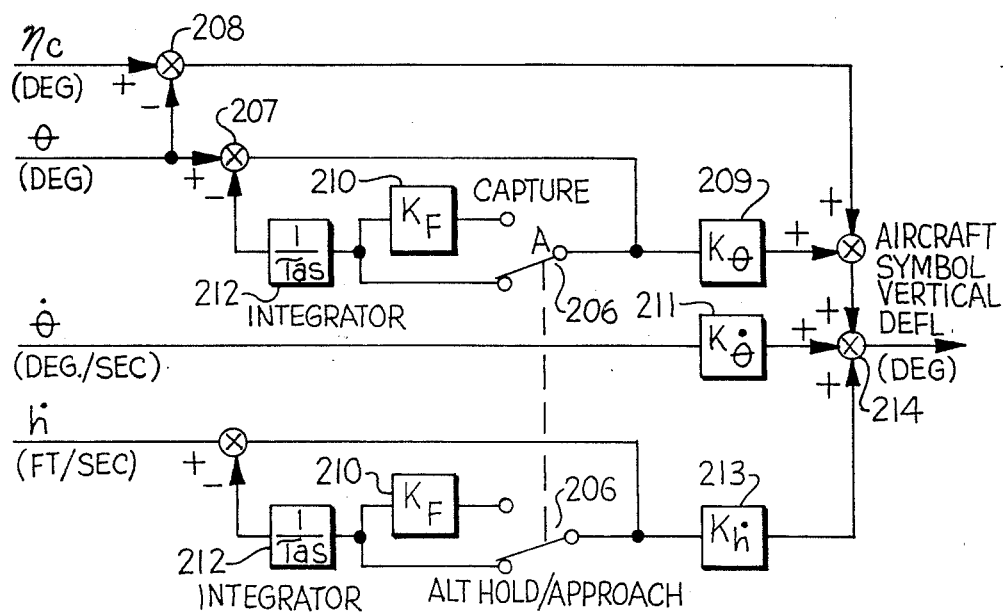
FIG. 12 is a block diagram illustrating particular lead circuitry for controlling vertical deflection of the aircraft symbol to provide altitude hold damping and transference to the descent path.
Figure 15:
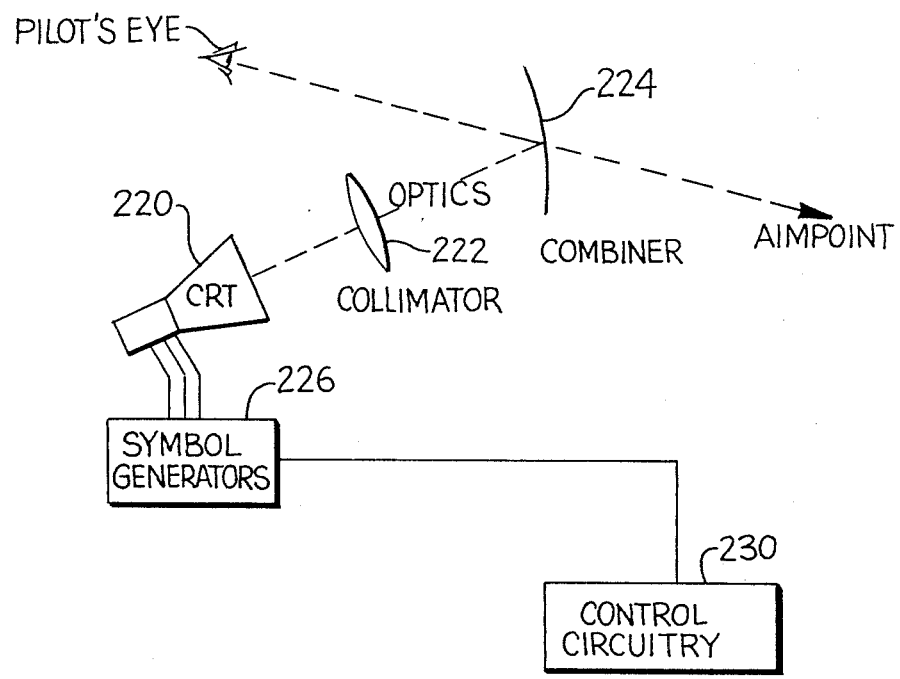

The circuit of FIG. 12 serves to provide a command signal for aircraft symbol deflection. The symbol is deflected by dynamic lead signals comprising washed-out pitch, pitch rate, and washed-out altitude rate coupled through optimized gains 209, 211 and 213 combined at summing stage 214. Other lead combinations can be used for altitude hold damping; for example washed-out pitch and pitch rate alone would be adequate. Also any lead $\eta_{ld}$ disclosed in my prior Pat. No. 4,104,612 would be satisfactory. With switch 206A in the position show (Alt. hold/Approach) integrator 212 will wash out the signal at summing stages 207 according to time constant $\tau_a$. $\tau_a$ is made sufficiently long to damp long period altitude transients. Like the aim symbol deflection, the steady state aircraft symbol deflection is $\eta_c$, which is pitch stabilized by $\phi$ at summing stage 208. The signal out of 208 is combined with the lead signals at summing stage 214 to produce the signal applied to the deflection circuit for the aircraft symbol.

An important adjunct of the altitude hold function is the transference from the altitude hold mode to the approach mode. FIGS. 10A-10B show the aim symbol 64 and the aircraft symbol 10 maintained in alignment at the fixed deflection angle $\eta_c$ at point c as the aircraft approaches the runway 30, flying at a constant selected altitude. At point d the display shows the aircraft symbol directly in line with the aimpoint on the runway, thus signifying that the aircraft is on the selected glidepath $\eta_c$ where the pilot should be controlling the aircraft to descend. Switch 206 (FIG. 11) should be opened to remove the altitude hold signal from the aim symbol. The pilot may transfer his control reference from the aim symbol to the aimpoint, thus transitioning to the approach mode with negligible eye movement or attention change. By removing the altitude hold error signal from the vertical deflection of the aim symbol, the aim symbol is converted to the fixed depression angle $\eta_c$. The aim symbol may or may not be removed from the display. In IFR conditions, the aim symbol can be converted to designate the runway aimpoint 34.

Capture of the glidepath without overshoot may be made easier by reducing the time constants of the pitch and altitude rate wash-outs during the period of capture as indicated in FIG. 12. At the instant of pitch-over, 206A is switched to the Capture mode so that the integrator gains will be increased to $K_F$ 210 and the time constant of the wash-outs will be reduced by the factor $1/K_F$. This allows the pitch and altitude rate steady state references to change more quickly from the values acquired in altitude hold to the glideslope values, thus minimizing the potential for overshoot. When the glidepath is established, 206A is switched back to Alt. Hold/Approach so that the time constants will revert to the longer period to damp long period altitude rate transients during the approach. Further details as to variations possible for aircraft symbol (command bar) lead circuitry ηld are described in my prior patent 4,104,612 and incorporated herein.

FIG. 13 depicts in block diagram form an overall system in accordance with the present invention. As shown in FIG. 13, a cathode ray tube 220 is used to develop a visual image which is applied through a collimating lens 222 to a combiner 224 which presents the display seen by the pilot. The combiner is a non-interfering transparent glass located between the pilot's eyes and his forward field-of-view. The image of the cathode ray tube 220 is developed by symbol generators 226 which generate the various symbols to be displayed in response to inputs from the control circuitry 230 as described hereinabove. Thus, the pilot is enabled to close the loop between the system signal outputs generated by circuitry 230 and his control of the aircraft by "flying" the aircraft symbol to coincide with the aim symbol. Additional symbology provide reference information to the pilot. Use of the system in this fashion substantially eases the pilot's task, particularly during landing approaches under adverse weather conditions, and may permit landing of the aircraft under IFR conditions.

Although there have been described above specific arrangements of a conformal head-up display in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined by the annexed claims.

What is claimed is:

1. Apparatus for providing guidance information to an aircraft pilot in the form of a conformal head-up display (HUD) which comprises:
   means for generating an aircraft symbol on the display that simulates the attitude, location and motion of his aircraft relative to the earth;
   means for generating symbols that simulate on the display selected ground cues in position and orientation which superimpose over actual selected ground cues as seen by the pilot when they are visible through the display;
   means for generating an aim symbol that is positioned on the display to provide a reference to which the aircraft symbol is directed for proper operation of the aircraft in selected flight modes;
   means for controlling the position of the aircraft symbol and the aim symbol in response to selected signal inputs to provide vertical guidance information in different phases of a landing approach from above transition height, through transition to flare height, and thence to touchdown;
   means for switching control of the aircraft symbol and of the aim symbol from one phase to the next; and
   means for providing a smooth transition from one set of selected signal inputs to the next as the aircraft descends through the respective phases.

2. The invention according to claim 1 wherein the controlling means comprises:
   means for depressing the aim symbol by a fixed angle below the horizontal, which depression angle may be selected by the pilot to equal the glideslope radio beam angle at a runway being approached; and
   means for positioning the aircraft symbol to be at any instant depressed below the horizontal by an angle equal to the angle at which the aircraft is descending at that instant, whereby by maneuvering the aircraft so that the aircraft symbol appears at the same depression angle as the aim symbol the pilot will cause the aircraft to descend at the selected descent angle.

3. The invention according to claim 1 including aircraft symbol vertical deflection circuitry which comprises:
   means for generating a selected angle signal equivalent to the desired approach descent angle;
   means for generating a feedback compensated control system dynamic lead signal;
   summing amplifier means for combining said selected angle signal with said dynamic lead signal to provide a compensated control system signal to control the vertical position of the aircraft symbol above transition height;
   means for generating below transition height a velocity vector signal which at any instant is equivalent to the angle of descent of the aircraft at that instant; and
   means for generating below flare height a descent rate signal that is equivalent to the measured descent rate of the aircraft.

4. The invention according to claim 4 wherein the transition providing means comprises:
   first variable gain amplifier means to vary the amplitude of said dynamic lead signal;
   means to reduce the gain of the first variable gain amplifier means from one above transition height to zero as aircraft altitude decreases;
   second variable gain amplifier means to vary the amplitude of said velocity vector signal;
   means to increase the gain of the second variable gain amplifier means from zero above transition height to one as the aircraft altitude decreases; and
   summing amplifier means for combining signals from the first and second variable gain amplifier means to provide a signal between transition height and flare height that smoothly transitions control of the aircraft symbol vertical deflection from dynamic lead signal control to velocity vector signal control.

5. The invention according to claim 3 wherein the transition providing means comprises:
   first variable gain amplifier means to vary the amplitude of said velocity vector signal;
   means to reduce the gain of the first variable gain amplifier means from one at flare height to zero as altitude decreases;
   second variable gain amplifier means to vary the amplitude of the descent rate signal;
   means to increase the gain of the second variable gain amplifier means from zero at flare height to one as altitude decreases; and
   summing amplifier means for combining the signals from the first and second variable gain amplifier means to provide, between flare height and touchdown, a signal that smoothly transitions control of the aircraft symbol vertical deflection from velocity vector signal control to descent rate signal control.

6. The invention according to claim 1 including aim symbol vertical deflection circuitry which comprises:
  means for receiving a glideslope radio directional beam signal and developing a glideslope error signal indicative of vertical angular deviation of the aircraft relative to the beam center;
  means for generating a selected descent angle signal corresponding to a selected approach angle of descent;
  summing amplifier means for combining the glideslope error signal with the selected descent angle signal to provide a glideslope reference signal to control the vertical position of the aim symbol above transition height;
  means for controlling the aim symbol vertical deflection in response to the selected descent angle signal below transition height; and
  means for generating below flare height a descent rate command signal.

7. The invention according to claim 6 wherein the transition providing means comprises:
  variable gain amplifier means to vary the amplitude of the glideslope reference signal;
  means to reduce the gain of the variable gain amplifier means from one at transition height to zero as a function of decreasing aircraft altitude; and
  summing amplifier means for combining the signal from the variable gain amplifier means with the selected angle signal to provide, between transition height and flare height, a signal that smoothly transitions control of the aim symbol vertical deflection from glideslope reference signal control to selected angle signal control.

8. The invention according to claim 6 wherein the transition providing means comprise:
  first variable gain amplifier means to vary the amplitude of said selected descent angle signal;
  means to reduce the gain of the first variable gain amplifier means from one at flare height to zero as aircraft altitude decreases;
  second variable gain amplifier means to vary the amplitude of said descent rate command signal;
  means to increase the gain of said second variable gain amplifier means from zero at flare height to one as aircraft altitude decreases; and
  summing amplifier means to combine the signals from the two variable gain amplifier means to provide, between flare height and touch-down, a signal that smoothly transitions control of the aim symbol vertical deflection from the selected descent angle signal control to the descent rate command signal control.

9. The invention according to claim 1 further including means for combining signal indicative of aircraft pitch rate and normal acceleration and applying a resultant signal to the aircraft symbol positioning means in order to add dynamic lead to the aircraft symbol motion to prevent aircraft symbol guidance from causing overshoot and oscillation in aircraft control.

10. Apparatus for providing guidance information to an aircraft pilot in the form of a conformal head-up display (HUD) which comprises:
  means for generating an aircraft symbol on the display that simulates the attitude, location and motion of his aircraft relative to the earth;
  means for generating symbols that simulate on the display selected ground cues in position and orientation which superimpose over actual selected ground cues as seen by the pilot when they are visible through the display;
  means for generating an aim symbol that is positioned on the display to provide a reference to which the aircraft symbol is directed for proper operation of the aircraft in selected flight modes; and
  means for controlling the position of the aircraft symbol and the aim symbol in response to selected signal inputs to provide vertical guidance information for constant altitude control, said controlling means comprising:
  (a) means for deflecting the aim symbol vertically relative to a selected fixed depression angle according to the error between measured altitude and a selected constant altitude; and
  (b) means for deflecting the aircraft symbol vertically relative to a selected fixed depression angle according to a dynamic lead signal in order to prevent guidance control overshoot and oscillation, whereby by maneuvering the aircraft so that said aircraft symbol maintains the same depression angle as said aim symbol the pilot will cause the aircraft to hold the selected altitude.

11. The invention according to claim 10 further comprising:
  means for generating a signal equivalent to said selected fixed depression angle;
  means for generating a signal equivalent to the error in measured aircraft altitude relative to the selected constant altitude; and
  summing amplifier means for combining said selected fixed depression angle signal with said error equivalent signal.

12. The invention according to claim 10 wherein signals corresponding to washed-out pitch, pitch rate, washed-out altitude rate and normal acceleration obtained from aircraft motion longitudinal measurements are combined to provide said dynamic lead signal.

13. The invention according to claim 12 wherein guidance is smoothly transitioned from said altitude hold mode to the descent mode by means of reducing the time constants of the washed-out pitch and washed-out altitude rate during the period of transition.

14. The invention according to claim 13 further comprising:
  switching means to remove the altitude error signal from the aim symbol deflecting means when the pilot sees the aircraft symbol superimposed over the point on the ground toward which he wishes to descend, and to transfer the aim symbol deflecting means to said selected fixed depression angle.

15. The invention according to claim 13 further comprising:
  switching means to remove the aim symbol from the display when the pilot observes superposition of the aircraft symbol over his aimpoint, thereby removing the aim symbol as a guidance reference, the guidance reference being transferred to said aimpoint.

16. The invention according to claim 13 further comprising:
  switching means to convert the aim symbol to display a perspective view of an aimpoint controlled in response to a ground-based radio directional beam upon superposition of the aircraft symbol over the aimpoint.

17. The invention according to claim 13 wherein said aircraft symbol providing altitude hold guidance is converted to provide descent path guidance further comprising:

switching means to reduce the time constants of the dynamic lead signal wash-out circuits when the pilot observes superposition of the aircraft symbol over his aimpoint, thereby allowing a quicker change of said dynamic lead signal from the altitude hold steady state value to an approach steady state value, and to increase the time constants of the dynamic lead signal wash-out circuits to their optimum value for tracking the selected angle path to the aimpoint when the selected angle path has been acquired, thereby completing the smooth transition to the descent mode.

18. Apparatus for providing guidance information to an aircraft pilot in the form of a conformal head-up display (HUD) which comprises:

means for generating an aircraft symbol on the display that simulates the attitude, location and motion of his aircraft relative to the earth;

means for generating an aim symbol that is positioned on the display to provide a reference to which the aircraft symbol is directed for proper operation of the aircraft in selected flight modes; and means for generating symbols that simulate on the display selected ground cues in position and orientation which superimpose over actual selected ground cues as seen by the pilot when they are visible through the display; the simulating symbol generating means comprising:

(a) means for receiving radial directional beam signals from a signal source located adjacent an airport runway, which source transmits a pattern of radio signals having a beam center and signals distinguishing displacement from beam center within the pattern, the receiving means including means for detecting from the received radio beam signals the deviation of the aircraft relative to the beam center;

(b) means responsive to the detecting means to locate in the display corresponding to the pilot's perspective view of the runway a simulated runway including a runway center line and an aimpoint on the center line toward which to aim the landing approach; and further including (i) means for manually supplying a magnetic bearing signal indicative of the orientation of the centerline of the runway being approached;

(ii) means for generating a magnetic heading signal indicative of the orientation of the aircraft;

(iii) summing amplifier means for combining the magnetic bearing signal and the magnetic heading signal to obtain a course error signal corresponding to the difference between the magnetic bearing signal and the magnetic heading signal;

(iv) means for generating an eye height signal equivalent to the height of the pilot's eyes relative to the terrain;

(v) means for generating an offset signal equivalent to the perpendicular displacement of the pilot's eyes from an extension of the runway centerline;

(vi) divider amplifier means for generating a perspective ratio signal equivalent to the ratio of said pilot's eye height to said pilot's eye displacement;

(vii) means for deriving a vertical angle signal corresponding to the vertical displacement of the aimpoint relative to the horizontal; and (viii) variable gain amplifier means for varying the amplitude of said vertical signal angle according to the amplitude of the perspective ratio signal.

19. The apparatus of claim 18 further including means for generating a glideslope error signal proportional to displacement of the aircraft from said beam center, means for developing signals corresponding to the inastantaneous rate of change of said glideslope error signal, means for generating a fixed signal proportional to a preselected approach angle of descent, means for generating a lead compensation signal, summing amplifier means for combining in a selected ratio said glideslope error and glideslope rate signals with said fixed signal and said lead compensation signal for providing an amplified vertical deflection signal, and means for applying said amplified vertical deflection signal to the aircraft symbol generating means to increase the separation between the aircraft symbol and the aim symbol for a given glideslope error.

20. Apparatus for providing guidance information to an aircraft pilot in the form of a conformal head-up display (HUD) which comprises:

means for generating an aircraft symbol on the display that simulates the attitude, location and motion of his aircraft relative to the earth;

means for generating symbols that simulate on the display selected ground cues in position and orientation which superimpose over actual selected ground cues as seen by the pilot when they are visible through the display;

means for generating an aim symbol that is positioned on the display to provide a reference to which the aircraft symbol is directed for proper operation of the aircraft in selected flight modes;

means for controlling the respective vertical positions of the aircraft symbol and the aim symbol in response to selected signal inputs to provide vertical guidance information;

means for receiving signals corresponding to a glideslope radio directional beam;

means for generating a glideslope error signal corresponding to aircraft position relative to said radio directional beam;

means for developing signals corresponding to the instantaneous rate of change of said glideslope error signal;

aircraft instrumentation means for providing signals corresponding to pitch angle, altitude rate and normal acceleration;

means for generating a fixed signal proportional to a preselected approach angle of descent;

means for generating a lead compensation signal in accordance with said preselected angle of descent signal and at least one of said signals from the instrumentation means;

summing amplifier means for combining in a selected ratio said glideslope error and glideslope rate signals with said fixed signal and said lead compensation signal to develop an aircraft symbol vertical deflection signal; and means for applying said vertical deflection signal to the means for controlling the position of the aircraft symbol to develop an augmented displacement of the aircraft signal relative to the aim signal for a given glideslope error.

21. The apparatus of claim 1 further including means for generating a fixed signal proportional to a preselected approach angle of descent, means for generating a lead compensation signal, means for receiving a glideslope radio directional beam signal, means for generating a glideslope error signal corresponding to aircraft position relative to the glideslope beam, summing amplifier means for combining in a selected ratio said glideslope error and glideslope rate signals with said fixed signal and said lead compensation signal to provide an amplified signal indicative of vertical displacement error, and means for applying said amplified signal to the means for controlling the position of the aircraft signal in order to develop an augmented vertical displacement of the aircraft symbol relative to the aim symbol for a given glideslope error.

* * * * *

UNITED STATES PATENT AND TRADEMARK OFFICE
CERTIFICATE OF CORRECTION

PATENT NO. : 4,454,496
DATED : 12 June 1985
INVENTOR(S) : James R. Lowe

It is certified that error appears in the above—identified patent and that said Letters Patent is hereby corrected as shown below:

In column 1, line 20, the word [hve] should be have.

In column 5, line 2, the word [th] should be the.

In column 8, line 57, the word [reduced] should be reduces.

In column 8, line 64, $[1 - \frac{T\psi S}{T\psi S + 1}]$ should be $1 - \frac{T\dot{\psi} \quad S}{T\psi \quad S + 1}$.

In column 9, line 14, $[1 - \frac{T\psi S}{T\psi S + 1}]$ should be $1 - \frac{T\psi \quad S}{T\psi \quad S + 1}$.

In column 9, line 68, the word $[\eta SEL]$ should be $^{\eta}\underline{SEL}$.

In column 10, line 28, $[\emptyset]$ should be $\underline{\theta}$.

In column 12, line 61, [altitude decreases; and] should be altitude decreases; second variable gain amplifier means to vary the amplitude of the descent rate signal;

UNITED STATES PATENT OFFICE
CERTIFICATE OF CORRECTION

PATENT NO. : 4,454,496

DATED : 12 June 1985

INVENTOR(S) : James R. Lowe

It is certified that error appears in the above-identified patent and that said Letters Patent are hereby corrected as shown below:

<u>means to increase the gain of the second variable gain amplifier means from zero at flare height to one as altitude decreases; and</u>

Signed and Sealed this

Eleventh Day of February 1986

[SEAL]

Attest:

Attesting Officer

DONALD J. QUIGG

Commissioner of Patents and Trademarks